United States Patent [19]

Sittmann

[11] 3,958,811
[45] May 25, 1976

[54] SAFETY SKI BINDING WITH SOLE PLATE
[75] Inventor: Brigitte Sittmann, Stuttgart, Germany
[73] Assignee: Vereinigte Baubeschlagfabriken Gretsch & Co. GmbH, Germany
[22] Filed: Feb. 25, 1974
[21] Appl. No.: 445,656

[30] Foreign Application Priority Data
Feb. 23, 1973 Germany............................ 2308898

[52] U.S. Cl................................. 280/618; 280/614
[51] Int. Cl.²......................................... A63C 9/086
[58] Field of Search............. 280/11.35 K, 11.35 R, 280/11.35 T, 11.35 A, 11.35 D, 11.35 C, 11.35 Y, 11.35 E

[56] References Cited
UNITED STATES PATENTS

| | | | |
|---|---|---|---|
| 3,606,370 | 9/1971 | Spademan | 280/11.35 T |
| 3,727,932 | 4/1973 | Druss et al. | 280/11.35 K |
| 3,752,491 | 8/1973 | Fend | 280/11.35 K |
| 3,771,806 | 11/1973 | Hinterholzer | 280/11.35 K |
| 3,797,841 | 3/1974 | McAusland | 280/11.35 R |
| 3,825,273 | 7/1974 | Greene | 280/11.35 K |
| 3,838,867 | 10/1974 | Kubelka | 280/11.35 E |

Primary Examiner—M. H. Wood, Jr.
Assistant Examiner—David M. Mitchell
Attorney, Agent, or Firm—Craig & Antonelli

[57] ABSTRACT

A safety ski binding with a sole plate to be clamped to the boot, which is fixed at the ski in several cross planes perpendicular to the ski surface and which is so latched that it is released against the latching action when relatively strong forces act on the binding in the sense of a binding release; the sole plate is thereby fastened at the ski in a center or rearward cross plane by lateral detent means on both sides of the ski in such a manner that for the purpose of unlatching in case of a twisting fall, it rotates about a point disposed in or approximately in this cross plane and/or is able to release in the upward direction during a forward fall; additionally, the sole plate is fastened in a second forward cross plane by the use of means, which hold the sole plate to the ski, yet permit a lateral deflection in this plane.

81 Claims, 7 Drawing Figures

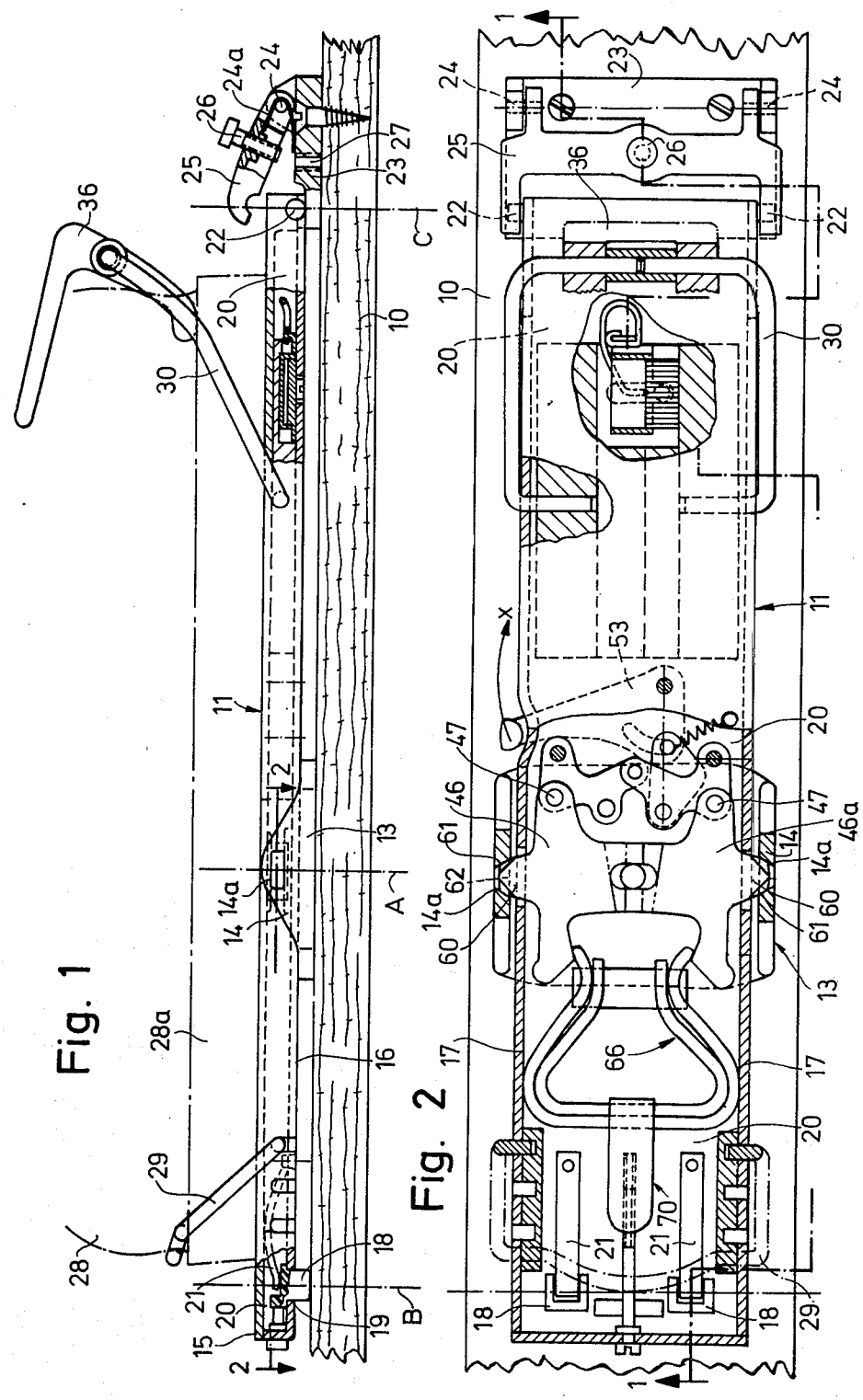

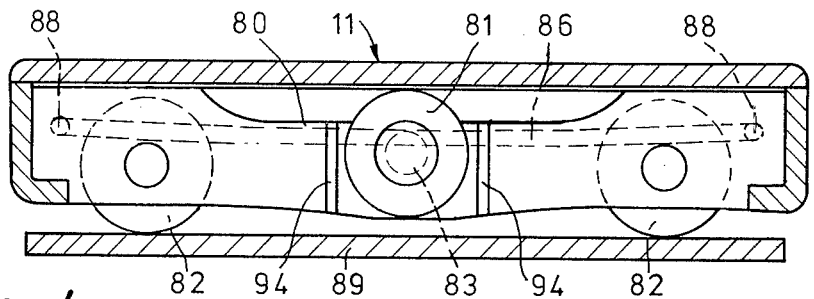
Fig. 4
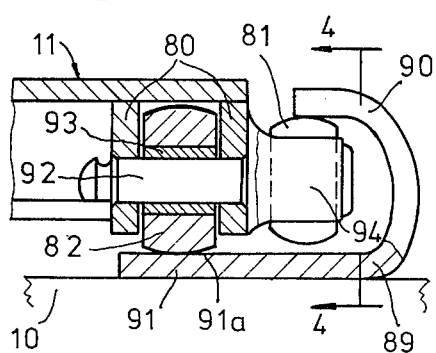
Fig. 6
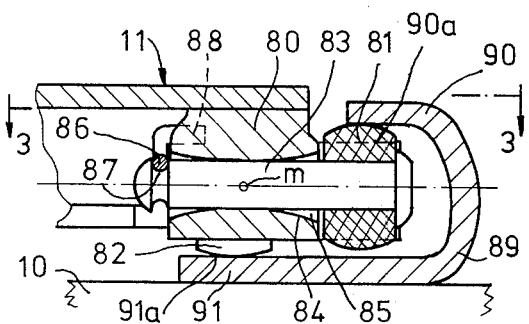
Fig. 5
Fig. 3
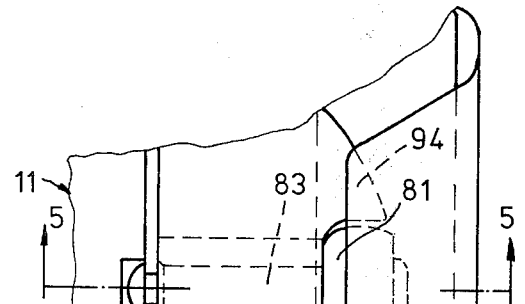
Fig. 7
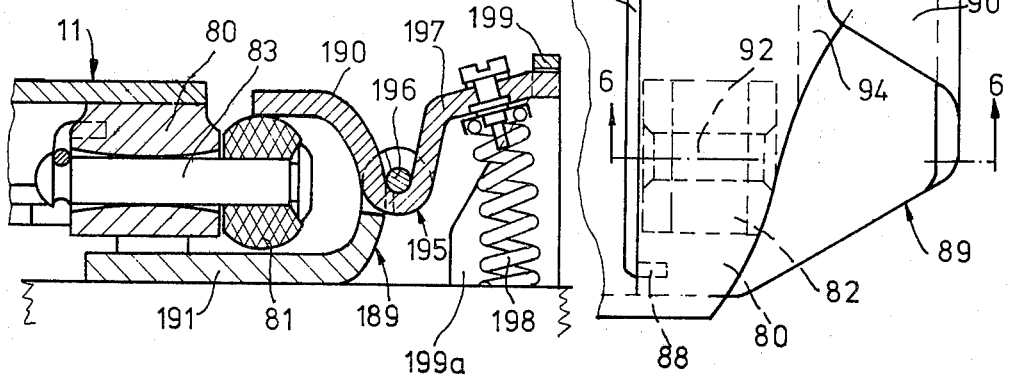

SAFETY SKI BINDING WITH SOLE PLATE

The present invention relates to a safety ski binding with a sole plate to be clamped to the boot, which is fixed to the ski in several cross planes perpendicular to the ski surface and is so latched that it is released against the detent or latching action during the occurrence of strong forces which act in the sense of a release of the binding.

The present invention is concerned with the task to assure a statically completely satisfactory support of the sole plate on the ski—also during strong flexing or bending—which enables simultaneously a safe release both in case of a forward fall as also in case of a twisting fall, and more particularly in such a manner that the cross forces and vertical forces which occur thereby, are reliably absorbed by simple means.

The present invention therefore consists in one significant aspect in that the sole plate is so fastened at the ski in a central or rearward cross plane by lateral latching or detent means on both sides of the ski that for purposes of unlatching or release during a twisting fall, it rotates about a point disposed in or approximately in this cross plane and/or it is able to release upwardly in case of a forward fall and that it is fastened in a second forward cross plane by means, which retain the sole plate at the ski yet (normally) enable a lateral deflection in this plane.

By the arrangement of lateral detent or latching means on both sides of the ski, a relatively large width of the detent or latching support is assured so that a detent pressure is attainable with relatively small detent or latching forces which can be well adjusted and matched to the desired conditions. For example, laterally elastic detent elements, for example, detent or latching levers may be used in connection therewith, which engage in counter-detents at the ski by means of corresponding inclined surfaces.

For purposes of fastening the sole plate at the ski in the forward cross plane, in one advantageous embodiment of the present invention, the sole plate is force-lockingly, preferably elastically supported in a third rear cross plane.

A particularly simple elastic support which can be structurally incorporated into the sole plate in an appropriate manner, results according to a further feature of the present invention in that for the purpose of the elastic support of the sole plate in openings or apertures thereof, one or several gliding slide elements are provided which are movably supported perpendicularly to the ski surface and are subjected to spring pressure. Preferably, the gliding slide elements consist of a low-friction material having best possible sliding characteristics, especially of a corresponding synthetic resinous material of known type. A particularly simple construction is made possible by the use of leaf-springs which are arranged on the inside of the hollow sole plate and which press the slide elements force-lockingly against the ski.

In order to be able to use the binding in an appropriate manner also for touring or cross-country, locking means are advantageously provided which form-lockingly lock a lifting off from the ski. An arrangement can be achieved thereby in which, especially if the detent or latching effect, by means of which the sole plate is latched to the ski, can be simultaneously reduced or completely eliminated, a rearward lifting off of the sole plate from the ski is made possible in that the sole plate is able to pivot up about a cross axis in the forward cross plane.

For purposes of achieving a particularly suitable and stable support in a forward cross plane, especially together with the possibility of a simultaneous release of the forward sole plate end in the cross direction of the ski, for example, during a twisting fall, according to a further feature of the present invention for purposes of fastening in this cross plane, the sole plate is supported upwardly and downwardly with respect to the ski by separate support elements which are preferably spring supported with respect to one another. Preferably low-friction elements are provided as support elements, especially rollers with axes of rotation extending in the ski longitudinal direction or approximately in this direction. A sliding out or rolling out of the support elements from the ski in the lateral direction, which is as unimpaired as possible, is enabled and assured thereby in case of danger.

Preferably the arrangement is made in such a manner that of three support elements mutually offset in the transverse direction of the ski, a center support element is supported from below against an upper counter support surface and two lateral support elements are supported from above against a lower counter support surface. Possibly, however, also a reversed arrangement may be provided. Preferably a support lug or bracket serves for the support which is constructed as an approximately triangularly shaped tapering plate with a mounting surface arranged transversely to the ski surface and with counter-support surfaces for two lateral support elements whereby the triangularly or trapezoidally shaped, converging forward part of the plate is bent back upon itself hook-shaped or U-shaped for the formation of an upper counter-support surface for a center support element. In order to prevent an injury to the skier in case of a fall by one or several projecting support elements and/or to protect the support elements against damages, the support elements may be protected and shielded by deflection walls arranged on both sides thereof and constructed wedge-shaped in the transverse direction.

Furthermore, the forward support is advantageously so constructed that it releases the sole plate against a detent or latching resistance in case of strong upwardly directed forces, for example, in case of a rearward fall.

These and further objects, features and advantages of the present invention will become more apparent from the following description when taken in connection with the accompanying drawing which shows, for purposes of illustration only, several embodiments in accordance with the present invention, and wherein:

FIG. 1 is a side elevational view, partly in cross section, of a safety ski binding with a sole plate in accordance with the present invention;

FIG. 2 is a plan view on FIG. 1, partly in cross section and taken along line 2—2 of FIG. 1, with one rearward and one forward support each of the sole plate at the ski;

FIG. 3 is a partial plan view on a further embodiment of the forward support mechanism in accordance with the present invention;

FIG. 4 is a cross-sectional view taken along line 4—4 of FIG. 6;

FIG. 5 is a cross-sectional view taken along line 5—5 of FIG. 3;

FIG. 6 is a cross-sectional view taken along line 6—6 of FIG. 3; and

FIG. 7 is a modified embodiment of the arrangement of FIG. 5.

Referring now to the drawing wherein like reference numerals are used throughout the various views to designate like parts, and more particularly to FIGS. 1 and 2, the sole plate generally designated by reference numeral 11 is mounted on the ski, as shown in these figures, and is latched to the ski in a cross plane A of the ski by detent or latching levers 46 and 46a which are pivotal about a joint 47, for example, an adjustable joint 47, in such a manner that the detent levers 46 and 46a are in operative engagement with detent apertures 14a of a U-shaped support member 13 secured at the ski. The detent or latching pressure is produced by a detent spring 66 (FIG. 2) which is accommodated in the hollow space 20 of the sole plate 11 of hollow construction and is adjustable in the longitudinal direction of the ski by means of an adjusting mechanism generally designated by reference numeral 70. The detent levers 46 and 46a are provided with detent projections 60 which are in operative engagement by means of inclined or beveled surfaces thereof with detent openings 14a of the support member 13 which taper to become narrower in the outward direction; the detent apertures 14a are thereby provided with surfaces beveled wedge-shaped in a horizontal plane as also with surfaces 62 beveled in a vertical plane. The operative engagement, especially for the purpose of stepping into the binding or stepping out of the binding, can be completely or partially eliminated by an adjusting lever 53 pivotal in the direction of arrow x and may be matched continuously to the desired wishes of the skier by the adjusting mechanism 70.

The sole plate 11 constructed as hollow body includes an upper wall 15 and a lower wall 16 with upwardly directed side walls 17 which are connected with the upper wall 15, for example, by riveting or welding, so that the sole plate 11 receives a box-shaped cross section. The sole plate 11 is supported at the ski in three cross planes A, B and C.

Two gliding slide elements 18 serve for the rear, support of the sole plate 11 on the ski in the ski cross plane B. The slide elements 18 project downwardly through apertures 19 in the bottom part 16 of the sole plate 11 and are pressed against the ski by leaf springs 21 secured at the bottom part 16 and accommodated in the hollow space 20 of the sole plate 11. The slide elements 18 are preferably made of synthetic resinous material, particularly of low-friction synthetic plastic material, so that they are able to slide on the ski 10 essentially without friction resistance.

At its forward end, the sole plate 11 is provided with lateral projections in the form of pins 22 directed laterally of the ski, which rest on a bearing support 23 fixed at the ski, against which they are pressed under the effect of the elastic support in the rear cross plane B, whereby the detent or latching means in the center cross plane A act as pivot bearing. The support of the pins 22 on the bearing support 23 is thereby such that they are able to slide off laterally from the bearing support 23 in case of occurring lateral forces.

The pins 22 serve simultaneously as locking pins and may be fixed at the ski by a locking member 25 pivotal at the bearing support 23 about cross pins 24 under the action of a spring 24a. A fixing screw 26 adapted to be screwed into and out of the pivot member 25, serves for purposes of fixation, which is adapted to be screwed into the threaded bore 27 of the bearing support 23 when the pivot member 25 is pivoted down. As a rule, the pins 22 are locked only for touring or cross-country in that simultaneously the latching in the cross plane A is eliminated by pivoting the adjusting lever 53 in the direction of arrow x.

A rear retaining lug 29 to be placed over the heel portion of the boot sole and a forward retaining lug 30 serving for the clamping of the boot sole at its forward end serve for the fastening of the boot 28 or of the boot sole 28a at the sole plate 11. The retaining lugs are connected with the sole plate 11 adjustable in the ski longitudinal direction by any conventional means whereby a clamping lever 36 serves for clamping the forward retaining lug 30.

If a strong upwardly directed force occurs at the boot and therewith at the sole plate 11, for example, at the boot heel, then the sole plate is able to unlatch and release upwardly by pressing the detent levers 46 and 46a inwardly whereby in the case of a forward fall, the sole plate is supported at the ski in the cross plane C.

In case of excessively strong torsional forces, for example, in case of a twisting fall, the sole plate 11 seeks to rotate in the cross plane A about an axis perpendicular to the ski surface. The detent projections 60 of the detent levers 46 and 46a are thereby able to pivot out of the counterdetents 14a by reason of the wedge-shaped bevelled surfaces 61 in that one detent lever, for example, detent lever 46 is forced out toward the rear whereas, for example, the opposite detent serves as pivot axis. Possibly also both detent levers 46 and 46a may be pivoted out of their respective counterdetents in opposite directions. Inclined surfaces arranged between the sole plate 11 and the support member 13 may be provided in order to lift the sole plate 11 over the bearing lugs or brackets 14 of the fixed bearing member 13 during the rotation of the sole plate.

In the embodiment according to FIGS. 3 to 6, a bearing bracket 80 is fixedly connected, for example, welded to the sole plate for the forward support thereof; the bearing bracket 80 serves for the bearing support of three rollers serving as support elements, namely, of a center roller 81 and of two lateral rollers 82. The center roller 81 which consists, for example, of conventional low-friction synthetic resinous material, is rotatably supported on a pivot pin 83 which is supported in a bore 84 that widens conically or spherically in a vertical plane toward both ends. The roller and pin may consequently yield about a center cross axis $m$ within the confines of the play 85 permitted by the bore enlargements in the one or other pivot direction about the axis $m$. A wire spring 86, which engages in an annular groove 87 of the pivot pin 83 and is anchored at its ends at 88 in the bearing bracket 80, forces the pivot pin 83 under spring stress in the downward direction at the end facing the same and therewith forces the roller 81 upwardly.

A support bracket generally designated by reference numeral 89 which is fixedly arranged at the ski 10, for example, is screwed to the ski 10, serves as counter-support member for the support rollers 81 and 82. The counter-support member 89, as shown in particular in FIGS. 5 and 6, is bent back upon itself hook-shaped or U-shaped at its forward triangularly or trapezoidally shaped tapering portion 90 and forms a counter-support surface 90a for the center roller 81. The lower flat portion 91 of the support bracket 89 serves for the fastening at the ski and forms a lower counter-support surface 91a for the two lateral rollers 82, preferably provided with crowned or spherical outer surfaces.

The lateral rollers 82 are rotatably supported in fork-shaped parts of the bearing bracket 80 by means of pivot pins 92 and for example, under interposition of a bearing bush 93.

As can be seen, the center roller 81 is offset in the longitudinal direction of the ski in relation to the lateral rollers 82 in that it projects forwardly beyond the bearing bracket 80 in order to be able to support itself against the upper counter-support surface 90a of the support bracket 89. It is achieved by the spring 86 that the rollers 81 and 82 abut at all times force-lockingly at their respective counter-abutment surfaces in mutually opposite vertical directions, yet permit a certain elastic play in the vertical direction.

If the sole plate is pivoted, for example, as a result of a twisting fall, about a center or rear axis perpendicular to the ski surface, then the sole plate is able to release itself at the forward end thereof from its support in that the rollers 81 and 82 are able to roll laterally out of the support bracket 89 along their respective counter support surfaces 90a and 91a.

In order to prevent any possible injuries to the skier by the roller 81 projecting forwardly out of the sole plate or also to prevent damage to this roller, the sole plate or the bearing bracket 80 is provided with rearwardly directed deflection walls 94 which project forwardly wedge-shaped on both sides of the roller 81 in planes parallel to the ski surface and protect and shield the roller 81 on both sides.

In the embodiment according to FIGS. 3 to 6, a support in a third plane at B (FIGS. 1 and 2) may be omitted. The latching takes place thereby advantageously in a cross plane A which lies further back with respect to the corresponding plane shown in FIGS. 1 and 2.

In the modified embodiment according to FIG. 7, which, as to the rest may correspond to the embodiment according to FIGS. 3 to 6, the forward support bracket 189 is subdivided into a fixed lower part 191 and into an upper pivotal part 190 connected therewith by a joint generally designated by reference numeral 195 having a joint bolt 196. The upper part 190 is extended as two-armed lever by way of the joint 195 and by means of its lever arm 197 forming the extension is supported with respect to the ski 10 by a preferably adjustable spring 198. A stop or abutment 199 arranged, for example, in the joint 195 or—as shown in the illustrated embodiment—at a bracket 199a fixed to the ski, may limit the upward travel of the lever arm 197. If an excessively strong upward force occurs at the roller 81, for example, as a result of a rearward fall, the support lever consisting of the two parts 190 and 197 is pivoted in the clockwise direction while overcoming the correspondingly prestressed spring 198 until it releases the roller 81 and therewith the sole plate 11.

While I have shown and described several embodiments in accordance with the present invention, it is understood that the same is not limited thereto but is susceptible of numerous changes and modifications as known to those skilled in the art. For example, the various, individual novel features of the present invention may also be used in connection with other known devices or may be combined with each other to provide other novel combinations within the purview of the present invention. Consequently, I do not wish to be limited to the specific embodiments as shown and described herein but intend to cover all such changes and modifications as are encompassed by the scope of the appended claims.

What I claim is:

1. A safety ski binding comprising:
   a sole plate,
   boot attaching means for attaching a ski boot to said sole plate,
   lateral detent means including inter-engageable lateral detent members carried by a ski and said sole plate for detachably fastening said sole plate to said ski, said lateral detent members being disposed at respective lateral sides of said sole plate in a first cross plane of said sole plate,
   latching means for maintaining said lateral detent members in engagement with one another to releasably latch said sole plate to said ski in such a manner that the lateral detent members are releasable from one another with a consequent release of said sole plate from said ski in response to forces acting on said sole plate corresponding to at least one of a twisting and forward fall of a skier using said ski boot,
   and sole plate supporting means disposed in a second cross plane of said sole plate and including means separate from said latching means and lateral detent members for supporting said sole plate in vertical position at said second cross plane while permitting lateral deflection of said sole plate in said second cross plane,
   wherein said supporting means includes a member laterally movably engageable with a surface of one of said ski and said sole plate and resilient means carried by the other of said ski and said sole plate for resiliently forcing said member against said surface to thereby elastically support said sole plate with respect to said ski at said second cross plane.

2. A safety ski binding according to claim 1, wherein said member is a slide member slidably engagable with said surface, and wherein said resilient means is a leaf spring having one end thereof attached to said slide member and the other end thereof attached to said sole plate.

3. A safety ski binding according to claim 1, wherein two of said members are provided, each of said members being slide members slidably engageable with said surface and being spaced laterally from one another in said second cross plane, and wherein said resilient means includes a pair of leaf springs which each have one end thereof attached to said sole plate and the other end thereof attached to respective ones of said slide members.

4. A safety ski binding according to claim 1, characterized in that the first cross plane is disposed within a center area of the sole plate.

5. A safety ski binding according to claim 1, characterized in that said first cross plane is disposed rearwardly of the center of the sole plate.

6. A safety ski binding according to claim 1, characterized in that said lateral detent means enable the sole plate to rotate about a point located at least approximately in said first cross plane for purposes of release of said sole plate during a twisting fall of said skier.

7. A safety ski binding according to claim 6, characterized in that said lateral detent means enable said sole plate to release upwardly in case of a forward fall of said skier.

8. A safety ski binding according to claim 1, characterized in that said lateral detent means enable said sole plate to release upwardly in case of a forward fall of said skier.

9. A safety ski binding according to 1, characterized in that further support means are provided for vertically supporting the sole plate at the ski in a third cross plane.

10. A safety ski binding according to claim 9, characterized in that said resilient means of the sole plate supporting means disposed in said second cross plane pivotally forces said sole plate about pivot means formed by said lateral detent means such that said sole plate is forced against the ski at said third cross plane.

11. A safety ski binding according to claim 9, characterized in that means are provided for elastically supporting the sole plate with respect to the ski in the third cross plane.

12. A safety ski binding according to claim 9, characterized in that said further support means includes means for rigidly supporting the sole plate in the vertical direction at the third cross plane.

13. A safety ski binding according to claim 12, characterized in that said member is a slide member supported in an aperture in said sole plate for movement perpendicularly to the ski surface by spring means forming part of said resilient means.

14. A safety ski binding according to claim 13, characterized in that several such slide members are provided which are movably supported by spring means forming said resilient means.

15. A safety ski binding according to claim 14, wherein said latching means includes detent spring means for resiliently biasing said lateral detent members into engagement with one another, and adjusting means carried by said sole plate for adjusting the detent spring means, the slide members being arranged on both sides of the adjusting means.

16. A safety ski binding according to claim 15, characterized in that the slide members consist of a material having good sliding properties.

17. A safety ski binding according to claim 15, characterized in that the slide members consist of a low-friction synthetic resinous material.

18. A safety ski binding according to claim 15, wherein said spring means includes leaf springs, characterized in that the slide members are subjected to the action of the leaf springs, said leaf springs being arranged in a hollow space formed on the inside of the sole plate.

19. A safety ski binding according to claim 1, characterized in that means are provided for elastically supporting the sole plate with respect to the ski in a plane other than the second cross plane.

20. A safety ski binding according to claim 1, characterized in that said member is a slide member supported in an aperture in said sole plate for movement perpendicularly to the ski surface by spring means forming part of said resilient means.

21. A safety ski binding according to claim 20, characterized in that several such slide members are provided which are movably supported by spring means forming said resilient means.

22. A safety ski binding according to claim 21, wherein said latching means includes detent spring means for resiliently biasing said lateral detent members into engagement with one another, and adjusting means carried by said sole plate for adjusting the detent spring means, the slide members being arranged on both sides of the adjusting means.

23. A safety ski binding according to claim 21, characterized in that the slide members consist of a material having good sliding properties.

24. A safety ski binding according to claim 21, characterized in that the slide members consist of a low-friction synthetic resinous material.

25. A safety ski binding according to claim 20, wherein said spring means includes leaf springs, characterized in that the slide members are subjected to the action of the leaf springs, said leaf springs being arranged in a hollow space formed on the inside of the sole plate.

26. A safety ski binding according to claim 1, wherein further support means are provided for vertically supporting the sole plate in a third forward cross plane, said further support means including separate support elements for supporting the sole plate in upward and downward directions against the ski.

27. A safety ski binding according to claim 26, characterized in that spring means are provided for mutually spring supporting the separate support elements.

28. A safety ski binding according to claim 26, characterized in that the support elements are constructed as rollers with pivot axes extending at least approximately in the longitudinal direction of the ski.

29. A safety ski binding according to claim 28, characterized in that the support elements are supported at the sole plate mutually offset in the transverse direction of the ski.

30. A safety ski binding according to claim 26, characterized in that at least one of the support elements consists of an elastic material.

31. A safety ski binding according to claim 26, characterized in that at least one of the support elements consists of a low-friction synthetic resinous material.

32. A safety ski binding according to claim 28, characterized in that the rollers consist of low-friction synthetic resinous material.

33. A safety ski binding according to claim 26, characterized in that means are provided for pivotally supporting at least one of the support elements within limits at the sole plate about a cross axis and for elastically forcing said support element about the cross axis against a counter-support surface.

34. A safety ski binding according to claim 28, characterized in that means are provided for pivotally supporting at least one of the rollers at the sole plate so as to be pivotal within limits about a cross axis and for elastically forcing said at least one of the rollers against a respective counter support surface about the corresponding cross axis.

35. A safety ski binding according to claim 34, characterized in that a wire spring means clamped transversely to the sole plate is provided for the elastic abutment of the support elements against respective counter-support surfaces thereof, said wire spring means abutting against at least one pivot pin of a support roller movably supported with play about a cross axis.

36. A safety ski binding according to claim 35, characterized in that of three support elements mutually offset in the ski transverse direction, a center support element is supported from below against an upper counter-support surface by center support means and two lateral support elements are supported from above against a lower counter-support surface by lateral support means.

37. A safety ski binding according to claim 35, characterized in that of three support elements mutually offset in the transverse direction of the ski, a center support element is supported from above against a lower counter-support surface by center support means and two lateral support elements are supported from below against an upper counter-support surface by lateral support means.

38. A safety ski binding according to claim 36, characterized in that the support element which is supported against its respective upper counter-support surface is offset in the longitudinal direction of the ski with respect to at least another other support element supported against the lower counter-support surface.

39. A safety ski binding according to claim 38, characterized in that said one support element is arranged at a support bracket in the sole plate.

40. A safety ski binding according to claim 38, characterized in that the counter-support surfaces for the support elements are formed by a hook-shaped bent-back fixed support bracket means with a lower counter-support surface for a least one support element supported in the downward direction and with an upper counter-support surface arranged at the bent-back free end of the support bracket means for at least one upwardly supported support element.

41. A safety ski binding according to claim 40, characterized in that the support bracket means is constructed as a tapering plate with a first portion arranged transversely to the ski surface and forming counter-support surfaces for the two lateral support elements and in that the tapering forward part of the plate is bent-back U-shaped for the formation of an upper counter-support surface for a center support element.

42. A safety ski binding according to claim 41, characterized in that the plate is constructed triangularly shaped.

43. A safety ski binding according to claim 41, characterized in that the plate is trapezoidally shaped.

44. A safety ski binding according to claim 41, with at least one support element directed forwardly at the sole plate, characterized in that said one support element is shielded by deflection walls for the lateral protection of the support element which are arranged on both sides thereof and constructed wedge-shaped in the transverse direction.

45. A safety ski binding according to claim 44, characterized in that the sole plate means are provided for releasing in case of excessive upwardly directed forces against a detent resistance by a forward detent means.

46. A safety ski binding according to claim 44, with a sole plate to be clamped to the ski boot which is supported in a forward cross plane against a lifting off from the ski and engages by means of a forward support element underneath a counter-support member, characterized in that the overlapping counter-support member is operable to be pivoted up against spring action for the release of the support element during excessive upwardly directed forces.

47. A safety ski binding according to claim 46, characterized in that the counter-support surface element is constituted by a lever arm of a two-armed lever whose other second lever arm which is directed forwardly from a joint fixed at the ski is under the effect of a prestressed detent spring.

48. A safety ski binding according to claim 47, characterized in that said detent spring is adjustable.

49. A safety ski binding according to claim 1, characterized in that several such slide members are provided which are each resiliently supported by said resilient means.

50. A safety ski binding according to claim 49, wherein said latching means includes detent spring means for resiliently biasing said detent members into engagement with one another, and adjusting means carried by said sole plate for the detent spring means, the slide members being arranged on respective lateral sides of the adjusting means.

51. A safety ski binding according to claim 50, characterized in that the sliding members consist of a material having good sliding properties.

52. A safety ski binding according to claim 1, wherein said resilient means includes a leaf spring, characterized in that the slide member is subjected to the action of the leaf spring, said leaf spring being arranged in a hollow space formed on the inside of the sole plate.

53. A safety ski binding comprising:
a sole plate,
boot attaching means for attaching a ski boot to said sole plate,
detent means including interengageable detent members carried by a ski and said sole plate for detachably fastening said sole plate to said ski, said detent members being disposed in a first plane of said sole plate,
latching means for maintaining said detent members in engagement with one another to releasably latch said sole plate to said ski in such a manner that the detent members are releasable from one another with a consequent release of said sole plate from said ski in response to forces acting on said sole plate corresponding to at least one of a twisting and forward fall of a skier using said ski boot,
and sole plate supporting means disposed in a second cross plane of said sole plate for supporting said sole plate in vertical position at said second cross plane, said sole plate supporting means including resilient means for resiliently supporting said sole plate at said ski in said second cross plane,
wherein said sole plate supporting means includes a member slidably laterally movably engageable with a surface of one of said ski and said sole plate, said resilient means being carried by the other of said ski and said sole plate for resiliently forcing said member against said surface to thereby elastically support said sole plate with respect to said ski at said second cross plane.

54. A safety ski binding according to claim 53, wherein all of said detent members are disposed at the respective opposite lateral sides of said sole plate.

55. A safety ski binding according to claim 53, wherein said resilient means is separate from and spaced from said lateral detent members and said latching means.

56. A safety ski binding according to claim 53, wherein said member is a slide member slidably engageable with said surface, and wherein said resilient means is a leaf spring having one end thereof attached to said slide member and the other end thereof attached to said sole plate.

57. A safety ski binding according to claim 53, wherein two of said members are provided, each of said members being slidably engageable with said surface and being spaced laterally from one another in said second cross plane, and wherein said resilient means includes a pair of leaf springs which each have one end thereof attached to said sole plate and the other end thereof attached to respective ones of said slide members.

58. A safety ski binding according to claim 53, wherein further support means are provided for vertically supporting the sole plate in a third forward cross plane, said further support means including separate support elements for supporting the sole plate in upward and downward directions against the ski.

59. A safety ski binding according to claim 58, characterized in that spring means are provided for mutually spring supporting the separate support elements.

60. A safety ski binding according to claim 58, characterized in that the support elements are constructed as rollers with pivot axes extending at least approximately in the longitudinal direction of the ski.

61. A safety ski binding according to claim 58, characterized in that the support elements are supported at the sole plate mutually offset in the transverse direction of the ski.

62. A safety ski binding according to claim 58, characterized in that at least one of the support elements consists of an elastic material.

63. A safety ski binding according to claim 58, characterized in that at least one of the support elements consists of a low-friction synthetic resinous material.

64. A safety ski binding according to claim 58, characterized in that means are provided for pivotally supporting at least one of the support elements within limits at the sole plate about a cross axis and for elastically forcing said support element about the cross axis against a counter-support surface.

65. A safety ski binding according to claim 60, characterized in that means are pivotally supporting at least one of the rollers at the sole plate so as to be pivotal within limits about a cross axis and for elastically forcing said at least one of the rollers against a respective counter support surface about the corresponding cross axis.

66. A safety ski binding according to claim 65, characterized in that a wire spring clamped transversely to the sole plate means is provided for the elastic abutment of the support elements against respective counter-support surfaces thereof, said wire spring means abutting against at least one pivot pin of a support roller movably supported with play about a cross axis.

67. A safety ski binding according to claim 58, characterized in that of three support elements mutually offset in the ski transverse direction, a center support element is supported from below against an upper counter-support surface by center support means and two lateral support elements are supported from above against a lower counter-support surface by lateral support means.

68. A safety ski binding according to claim 58, characterized in that of three support elements mutually offset in the transverse direction of the ski, a center support element is supported from above against a lower counter-support surface by center support means and two lateral support elements are supported from below against an upper counter-support surface by lateral support means.

69. A safety ski binding according to claim 67, characterized in that the support element which is supported against its respective upper counter-support surface is offset in the longitudinal direction of the ski with respect to at least another other support element supported against the lower counter-support surface.

70. A safety ski binding according to claim 58, wherein counter-support surfaces formed by a hook-shaped bent-back fixed support bracket means are provided with a lower counter-support surface for at least one support element supported in the downward direction and with an upper counter-support surface arranged at the bent-back free end of the support bracket means for at least one upwardly supported support element.

71. A safety ski binding according to claim 70, characterized in that the support bracket means is constructed as a tapering plate with a first portion arranged transversely to the ski surface and forming a pair of counter-support surfaces for two lateral support elements and in that a tapering forward part of the plate is bent-back U-shaped for the formation of an upper counter-support surface for a center support element.

72. A safety ski binding according to claim 58, with at least one of said support elements being directed forwardly at the sole plate, characterized in that deflection walls for the lateral protection of the support element are arranged on both sides thereof and are constructed wedge-shaped in the transverse direction, said deflection walls serving to shield the one support element.

73. A safety ski binding according to claim 72, characterized in that the one support element is a roller.

74. A safety ski binding according to claim 58, characterized in that means are provided for releasing the sole plate in case of excessive upwardly directed forces against a detent resistance at a forward detent means.

75. A safety ski binding according to claim 58, wherein an overlapping counter-support member is provided which is operable to be pivoted up against spring action for the release of one of said support elements during excessive upwardly directed forces.

76. A safety ski binding according to claim 75, characterized in that a counter-support surface for the one of said support elements is constituted by a lever arm of a two-armed lever whose other second lever arm which is directed forwardly from a joint fixed at the ski is under the effect of a prestressed detent spring.

77. A safety ski binding according to claim 76, characterized in that said detent spring is adjustable.

78. A safety ski binding comprising:
a sole plate,
boot attaching means for attaching a ski boot to said sole plate,
lateral detent means including interengageable lateral detent members carried by a ski and said sole plate for detachably fastening said sole plate to said ski, said lateral detent members being disposed at respective lateral sides of said sole plate in a first cross plane of said sole plate,
and latching means for maintaining said lateral detent members in engagement with one another to releasably latch said sole plate to said ski in such a manner that the lateral detent members are releasable from one another with a consequent release of said sole plate from said ski in response to forces acting on said sole plate corresponding to at least one of a twisting and forward fall of a skier using said ski boot,
wherein said lateral detent members include detent apertures formed in wall members fixed to said ski and detent levers carried by said sole plate which are movable into and out of said detent apertures, and wherein said latching means includes detent spring means for continuously biasing said detent levers toward a position corresponding to engagement in said apertures.

79. A safety ski binding according to claim 78, wherein means are provided for adjustably moving said detent spring means in a longitudinal direction of said sole plate, to vary the biasing force of said detent spring means against said detent levers.

80. A safety ski binding according to claim 79, wherein said detent spring means and said detent levers are disposed inside of a hollow space formed in said sole plate.

81. A safety ski binding according to claim 78, wherein sole plate supporting means are provided which include means for resiliently supporting said sole plate at said ski in a second cross plane of said sole plate.

* * * * *